April 12, 1932.   G. F. MURPHY   1,853,168
PIPE COUPLING
Filed Jan. 26, 1931
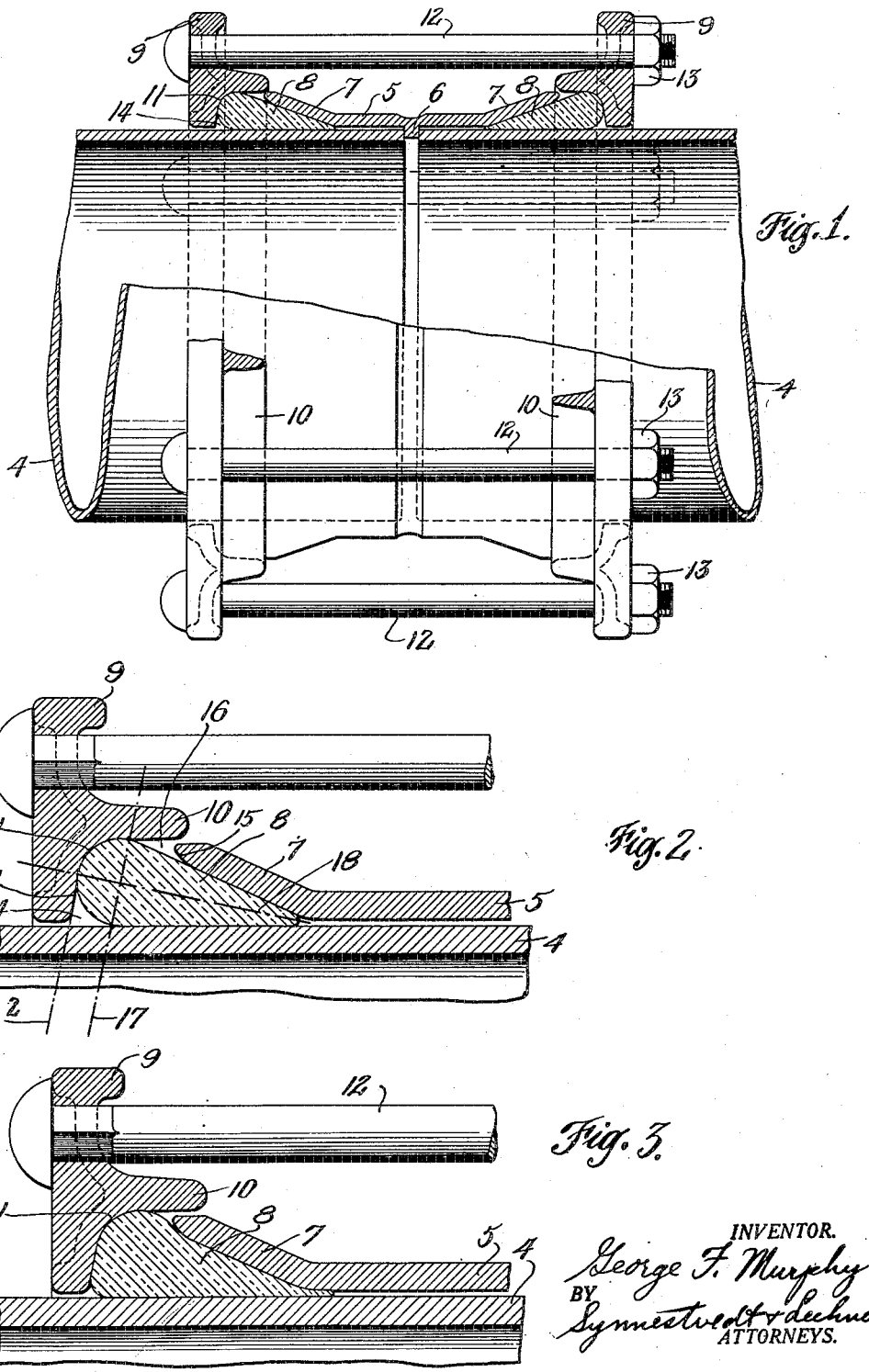
INVENTOR.
George F. Murphy
BY
Synnestvedt & Lechner
ATTORNEYS.

Patented Apr. 12, 1932

1,853,168

UNITED STATES PATENT OFFICE

GEORGE F. MURPHY, OF PHILADELPHIA, PENNSYLVANIA

PIPE COUPLING

Application filed January 26, 1931. Serial No. 511,286.

This invention relates to new and useful improvements in the pipe couplings particularly of the type in which the packing serves not only to prevent leakage, but also to hold the pipe lengths through the medium of frictional engagement.

The primary object of the invention is to provide an improved coupling of the character described.

Other objects and the advantages of the improvement will appear in the following description of the invention, taken in connection with the drawings, wherein—

Fig. 1 is a partial side elevation and partial vertical section showing my improvements, and Figs. 2 and 3 are fragmentary sectional views drawn on an enlarged scale to more clearly illustrate certain of the parts.

Referring now to the drawings, 4—4 indicate the adjacent ends of two juxtaposed pipe lengths of a pipe line. Surrounding the adjacent ends of the pipe sections is a sleeve 5 which has an inner annular spacer flange 6. The ends 7—7 of the sleeve are flared outwardly so as to provide packing receiving recesses between the wall of the pipe and such flared ends.

Each packing comprises an annular-like member 8 composed of a resilient material such, for example, as a suitable rubber compound. The packing is wedge-shaped in cross section and the head end thereof is preferably rounded. The length of the packing is substantially greater than the length of the recesses formed by the flared end 7 and the wall of the pipe sections. Follower clamping rings 9—9 and connecting bolts 12 and nuts 13 complete the coupling.

By reference more particularly to Figs. 2 and 3 it will be seen that the follower rings 9 have a laterally extending annular flange 10 adapted to clear the end of the flared portion 7 of the sleeve 5. The flange 10 is gradually merged with the ring 9 providing a rounded surface 11 preferably struck on the same radius as is the rounded head of the wedge-shaped packing. From the rounded surface 11 the remaining surface 11' inclines and extends in a plane indicated by the line 11² parallel to the line 17 drawn through the center from which the rounded head of the wedge-shaped packing is struck and at right angles to the axial line 18 of the packing.

At the ends of the portion 7 the surfaces are rounded as indicated at 15.

In the position shown in Figs. 1 and 2 the follower rings have just been applied and are about to be tightened up or clamped home. In this position it will be seen that there is an annular space 14 between the head, the wall of the pipe section and the inner portion of the follower ring, and an annular space 16 between the packing and the flared portion 7 and the flange 10.

As the follower rings are drawn toward one another, the packing is compressed and forced into the packing recess, and as further clamping takes place, the head of the packing deforms, substantially filling the annular spaces 14 and 16, because the cooperating surfaces of the various members are so disposed that longitudinal movement of the follower rings produces a resultant force tending to crowd or converge the packing toward the pipe section. Since the packing, considered as a whole, cannot move radially inward, the net result is that it is tightly jammed into the packing recess and the head thereof is jammed against the wall of the flange, the packing assuming, in cross section, the shape shown in Fig. 3 when the follower rings are drawn home. On comparison of Figs. 2 and 3 it will be seen that the length of contact of the wedge packing with the sleeve is increased and the length of contact between the packing and the pipe section is increased when the follower rings are drawn home. This takes place, notwithstanding the compression of the packing.

The net result is that a maximum contact is provided not only for sealing purposes, but also to prevent separation of the pipe lengths under pressure.

In this connection it is to be understood that this type of coupling is employed in pipe lines carrying pressures as high as 500 pounds per square inch or more, the frictional grip of the backing on the surface of the pipe sections being sufficient to hold the latter.

Heretofore the arrangement of the parts has been such that the length of contact has been decreased as the follower rings are drawn home, which means that for a given pressure it was necessary to draw up the follower rings more tightly than is required by my invention. One of the advantages of my improvement is that it is not necessary to completely compress the packing in order to obtain an effective seal and, therefore, the packing retains a greater measure of flexibility, permitting weaving of the pipe line in service. Longer life for the packing also results. The rounding of the surfaces 15 of the flared portions 7 reduces the liability of any cutting action on the packing, and, at the same time, helps to increase the length of surface contact with the flared portions.

The configuration of the head end of the wedge-shaped packing need not necessarily be rounded as shown. The outer surface of the head may be said, generally speaking, to incline from the horizontal axis of the pipe sections at an angle less than a right angle, and any surface of this general characteristic will serve to accomplish the desired results.

I claim:—

1. In a pipe coupling comprising a sleeve with flared ends and clamping rings adapted to be drawn toward the ends of said sleeve, said clamping rings having concave seats in the face thereof toward said flared ends, wedge-shaped gasket rings adapted to engage between the pipe and the flared ends of the sleeve, said gasket rings each having an arcuate head portion disposed out of contact with the pipe and adapted to be so engaged with the concave seats in the clamping rings that when the clamping rings are moved toward each other pressure will be exerted on the wedge-shaped gasket rings on a side thereof away from the pipe whereby the gasket rings are forced radially inwardly toward said pipe.

2. In a pipe coupling comprising a sleeve with flared ends and clamping rings adapted to be drawn toward the ends of said sleeve, said rings having concave-like seats in the faces toward said flared ends, wedge-shaped gasket rings adapted to engage between the pipe and the flared ends of the sleeves, said gasket rings each having a head which is out of contact with the pipe and which diminishes in cross section and which is adapted to be so engaged with one of said seats in the respective clamping ring that when the clamping rings are moved toward each other pressure will be exerted on the wedge-shaped gasket rings on the side thereof away from the pipe whereby the gasket rings are forced radially inwardly toward said pipe.

In testimony whereof I have hereunto signed my name.

GEORGE F. MURPHY.